No. 716,533. Patented Dec. 23, 1902.
C. O. HARKER.
POISON HOLDER.
(Application filed Apr. 8, 1902.)
(No Model.)
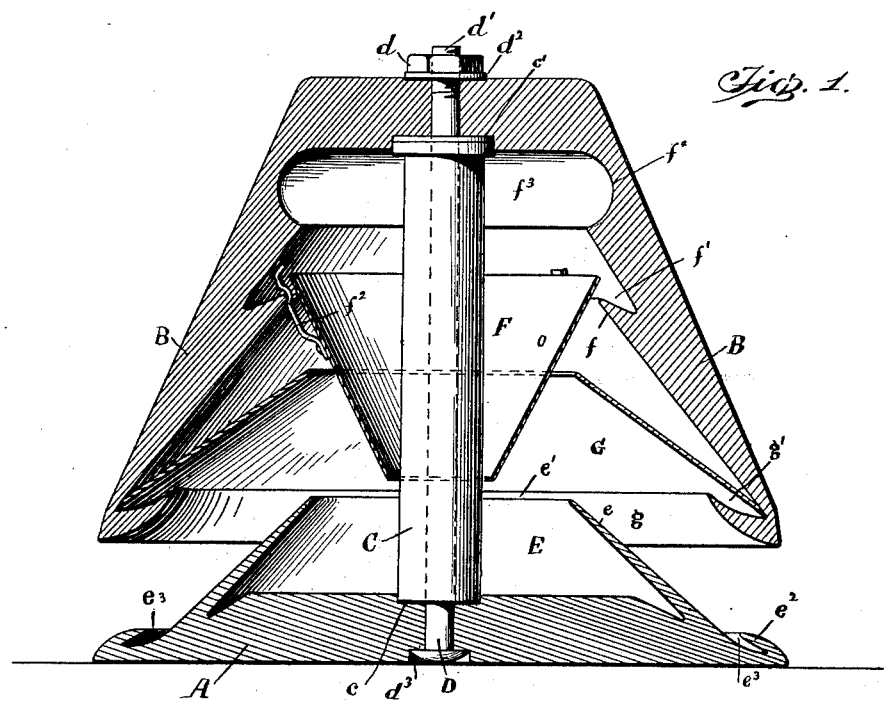
*Fig. 1.*
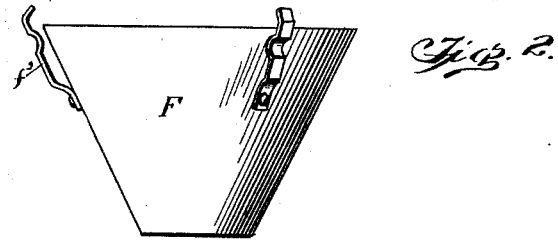
*Fig. 2.*
*Fig. 3.*
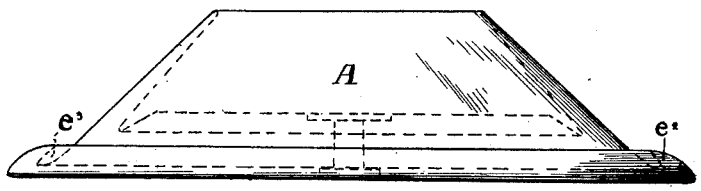
Witnesses.
Inventor,
Charles O. Harker,
By
Attorney.

UNITED STATES PATENT OFFICE.

CHARLES O. HARKER, OF SIOUX CITY, IOWA.

POISON-HOLDER.

SPECIFICATION forming part of Letters Patent No. 716,533, dated December 23, 1902.

Application filed April 8, 1902. Serial No. 101,868. (No model.)

*To all whom it may concern:*

Be it known that I, CHARLES O. HARKER, a citizen of the United States, residing at Sioux City, in the county of Woodbury and State of Iowa, have invented certain new and useful Improvements in Poison-Holders; and I do hereby declare the following to be a full, clear, and exact description of the invention, such as will enable others skilled in the art to which it appertains to make and use the same.

This invention relates generally to the art of animal or insect destroyers, and has for its primary object the provision of a poison or insecticide holder or receptacle which will possess certain novel and desirable characteristics to be hereinafter described and claimed.

Owing to the many and obvious dangers incident to the use of poison for the purpose set forth it is quite necessary that the holder or receiver designed for containing the same should be of such a nature as to itself constitute a warning to persons who are ordinarily subjected to the risk of confusing the poison with articles of less dangerous properties. This desideratum I accomplish by the present invention.

The invention still further embraces the idea of providing a holder or receptacle for poison so formed as to permit ready access of small animals or insects to the interior thereof, but will prevent the hand of a person from gaining access thereto.

Another object of the invention is to provide a holder which, although of a nature to permit ready access of animals or insects to the poison on the interior thereof, will effectually prevent any spilling of the poison in the event of the holder being upset or inverted.

Novel details in the construction and arrangement of the several parts of the holder will be apparent from the accompanying detailed description when read in connection with the drawings forming a part hereof, and in which—

Figure 1 is a vertical sectional view of the complete holder with the parts assembled in operative relation. Fig. 2 is a detail elevation of one of the deflectors, and Fig. 3 is an elevation of the base portion of the holder.

Referring more specifically to the drawings, like reference characters designate corresponding parts in the several views.

A designates the base of the holder, which may be of any desirable contour, preferably circular, and B designates the cap or cover portion thereof. For securing the base and cover together a spacing-sleeve C is interposed therebetween, with its ends projecting into suitable seats $c$ $c'$, formed therein, and a headed bolt D passes through said base and cover and the sleeve and is secured firmly in place by a binding-nut $d$, engaging a screw-threaded end $d'$ thereof, a washer $d^2$ overlying the upper surface of the cover between the same and said nut. A recess $d^3$ is formed in the lower surface of the base for the reception of the head of the bolt D, for obvious reasons.

The base A is formed with a hollow interior E, designed to receive poison or insecticide, whether the same be of a liquid, powdered, granular, or solid nature or a bait material covered or impregnated with the poison. The surrounding wall $e$ of the base is inclined from its mouth or upper edge $e'$ in a direction downwardly and outwardly therefrom, whence it terminates at the base of an upwardly and inwardly extending flange $e^2$ for purposes to be pointed out.

The cover or cap B is preferably frusto-conical and hollow. Intermediate of the top and the lower edge of the cover, on the interior thereof, is an inwardly and upwardly projecting flange $f$, forming with the wall of the cover a pocket $f'$.

Surrounding the sleeve C, but properly separated therefrom, is a central deflector F, also frusto-conical in shape, but occupying an inverted position and held in place by spring-arms $f^2$, disposed around the upper portion thereof and engaging the inner edges of the flange $f$. The wall of the cover extending upwardly from the flange $f$ is inclined inwardly to a point beyond the vertical plane of the upper edge of the deflector F and terminates at the lower end of a cavity $f^3$ at the top of the cover, the surrounding wall of said cavity being curved in a vertical direction, as at $f^4$, as shown.

From that portion of the description just described it will be seen that the base of the holder normally contains the poison, and, if the same is of a liquid, powdered, or granular substance, should the holder become inverted the poison would escape from the mouth of the base, but rather than escaping to the interior would be directed against the central deflector F, and from thence would fall into the cavity $b^3$, whereupon the holder being again righted the escaped material would fall from the lower edge of the walls surrounding said cavity and overhanging the upper edge of the deflector F into said deflector and be directed thereby back into the hollow portion of the base, the deflector in this instance operating after the fashion of a funnel.

Some provision should be made for catching any material which might escape from the hollow base and fall onto that portion of the interior of the cover below the flange $f$. I therefore form at the lower edge of the cover an inwardly and upwardly extending flange $g$, corresponding to the flange $f$, this flange $g$ forming with the wall of the cover a pocket $g'$, similar to the pocket $f'$. The interior wall of the cover is inclined inwardly and upwardly from the base of the pocket $g'$ to the edge of the flange $f$, so that any material falling against said wall when the holder is tilted or inverted will be directed to the cavity $f^3$ and returned to the base in the manner heretofore described. An auxiliary deflecting-plate G rests in the pocket $g'$ and extends upwardly and inwardly to a point slightly short of the surface of the deflector F. The purpose of this auxiliary deflector is to direct any material escaping from the base and deposited in the pocket $g'$, when the holder is turned over sidewise, to the central deflector, thence to the cavity $f^3$, and returned to the base. Should perchance any material be deposited in the pocket $e^3$, formed between the flange $e^2$ and the outer surface of the base, upon inverting the holder such material will fall upon the auxiliary deflector G, thence upon the central deflector F, whence it is deposited in the cavity $f^3$, and thereafter upon the righting of the holder returned to the hollow interior portion of the base.

It is of course to be understood that the peculiar configuration of any of the parts is not essential and that many minor changes in the construction and arrangement of such parts may be made without in the least departing from the nature and principle of the invention.

From the foregoing specification it will be appreciated that I have provided a holder from which it is practically impossible to spill or shake out any of the contents, a holder which while permitting small animals and insects to have access to the interior thereof will at the same time prevent the hands of persons from being inserted into such interior, and a holder the peculiar formation and appearance of which is of a rather quizzical character, thus serving as a warning to persons contemplating the using of the contents.

Having thus described the invention, what is claimed as new, and desired to be secured by Letters Patent, is—

1. A holder of the character described comprising a hollow base adapted to contain poison or the like, means for catching any material escaping from said base, and means for directing said escaped material back into the hollow base, substantially as described.

2. A holder of the character described comprising a device adapted to hold poison or the like, an inlet to said device, means for catching any material escaping from said device, and means for directing said escaped material back into said device, substantially as described.

3. A holder of the character described comprising a device adapted to hold poison or the like, an inlet to said device, and means for recovering and directing back to said device any material escaping therefrom, substantially as described.

4. A holder of the character described comprising a device adapted to hold poison or the like, an inlet to said device, and means for catching any material escaping from said device when the same is moved, substantially as described.

5. A holder of the character described comprising a hollow base A, a cover B, means for securing the cover in place, means associated with the cover for catching material escaping from the hollow base, and means for directing such escaped material back to the hollow base, substantially as described.

6. A holder of the character described comprising a hollow base A adapted to contain poison or the like, a flange $e^2$ on said base forming with the surface thereof a pocket $e^3$ adapted to catch material escaping from the base, a cover portion B, means for securing the cover portion in place, and means associated with the cover portion adapted when the holder is inverted to catch such escaped material and direct the same back to the hollow base, substantially as described.

7. A holder of the character described comprising a hollow base A adapted to contain poison or the like, a cover B provided with a cavity $b^3$, means for securing the cover in place, and an inverted centrally-disposed approximately frusto-conical deflector F underlying the cavity in the cover and over the mouth of the hollow base, substantially as and for the purpose described.

8. A holder of the character described comprising a device adapted to hold poison or the like, a portion B above said device and provided with a cavity $b^3$, and an inverted approximately frusto-conical deflector F underlying the cavity $b^3$ and arranged above the holding device, substantially as and for the purpose described.

9. A holder of the character described comprising a hollow base adapted to contain poison or the like, a cover for said base surrounding the mouth thereof, said cover having an upwardly and inwardly inclined wall on its interior, and a pocket at the lower end of said inclined wall adapted to catch any material escaping from the base and falling thereon when the holder is tilted; substantially as described.

10. A holder of the character described comprising a hollow base adapted to contain poison or the like, a cover for said base surrounding the mouth thereof, said cover having a cavity $b^3$ therein and a pocket adapted to catch any material escaping from the base when the holder is tilted, means for causing such escaped material caught in said pocket to fall therefrom into the cavity $b^3$ when the holder is inverted, and means for directing such material from said cavity back into the hollow base when the holder is righted; substantially as described.

11. A holder of the character described comprising a device adapted to hold poison or the like, a cover for said device surrounding the mouth thereof, said cover having a cavity $b^3$ therein and a pocket adapted to catch any material escaping from the device when the holder is tilted, means for causing such escaped material caught in said pocket to fall therefrom into the cavity $b^3$ when the holder is inverted, and means for directing such material from said cavity back into the holding device when the holder is righted; substantially as described.

12. A holder of the character described comprising a hollow base adapted to contain poison or the like, a cover spaced therefrom to provide an entrance to the interior, a spacing device interposed between the base and the cover, and means associated with said spacing device for clamping the cover in position, substantially as described.

13. A holder of the character described comprising a hollow base adapted to contain poison or the like, a cover spaced therefrom to provide an entrance to the interior, a spacing-sleeve interposed between the base and the cover, and means for securing the base and the cover together comprising a bolt passing through the spacing-sleeve, and retaining devices at the ends of the bolt, substantially as described.

14. A holder of the character described comprising a device adapted to hold poison or the like and provided with an upwardly-extending surrounding wall, a hollow cover supported over the mouth of said device and with its lower edge occupying a plane below that of said mouth and spaced from the holder to form an inlet to the interior, means for properly spacing apart said device and its cover, and means associated with said spacing means for clamping the cover in position, substantially as described.

In testimony whereof I affix my signature in presence of two witnesses.

CHARLES O. HARKER.

Witnesses:
T. C. PRESCOTT,
SADIE E. CATHCART.